United States Patent [19]

Richards

[11] Patent Number: 5,431,243
[45] Date of Patent: * Jul. 11, 1995

[54] THREE WHEELED VEHICLE WITH ALL WHEEL STEERING

[76] Inventor: Donald C. Richards, P. O. Box 685, Walpole, N.H. 03608

[*] Notice: The portion of the term of this patent subsequent to Sep. 28, 2010 has been disclaimed.

[21] Appl. No.: 107,075

[22] Filed: Aug. 17, 1993

Related U.S. Application Data

[63] Continuation-in-part of Ser. No. 824,343, Jan. 23, 1992, Pat. No. 5,248,011.

[51] Int. Cl.$^6$ ............................................. B62D 61/06
[52] U.S. Cl. ..................................... 180/211; 180/215
[58] Field of Search ................... 280/103, 98, 92, 691, 280/696; 180/215, 216, 210

[56] References Cited

U.S. PATENT DOCUMENTS

| | | |
|---|---|---|
| 1,242,500 | 10/1917 | Wilcox . |
| 2,559,379 | 7/1951 | Szekely . |
| 4,020,914 | 5/1977 | Trautwein . |
| 4,162,605 | 7/1979 | Olin et al. . |
| 4,263,977 | 4/1981 | Willett . |
| 4,448,278 | 5/1984 | Badsey . |
| 4,589,510 | 5/1986 | Duerwald et al. . |
| 4,703,824 | 11/1987 | Iramajiri et al. . |
| 4,787,470 | 11/1988 | Badsey . |
| 5,248,011 | 9/1993 | Richards ............................ 180/215 |

FOREIGN PATENT DOCUMENTS

| | | | |
|---|---|---|---|
| 854173 | 4/1940 | France | 280/43 |
| 455780 | 2/1927 | Germany | 180/215 |

*Primary Examiner*—Karin L. Tyson
*Attorney, Agent, or Firm*—Richard C. Litman

[57] ABSTRACT

A three wheeled vehicles has two front wheels and one rear wheel. The front wheels are driven. Both front and rear wheels are steered. A novel steering linkage causes the vehicle to steer with directionally conventional response to a steering input, in that the direction of turning a steering wheel or bar is also the direction in which the vehicle turns. A rear axle assembly provides uncomplicated construction accommodating both the steering and a spring and shock absorber type suspension. In a first embodiment, bodywork covers the front of the vehicle, spanning both front wheels. In a second embodiment, bodywork is extended to envelope substantially the entire vehicle.

10 Claims, 6 Drawing Sheets

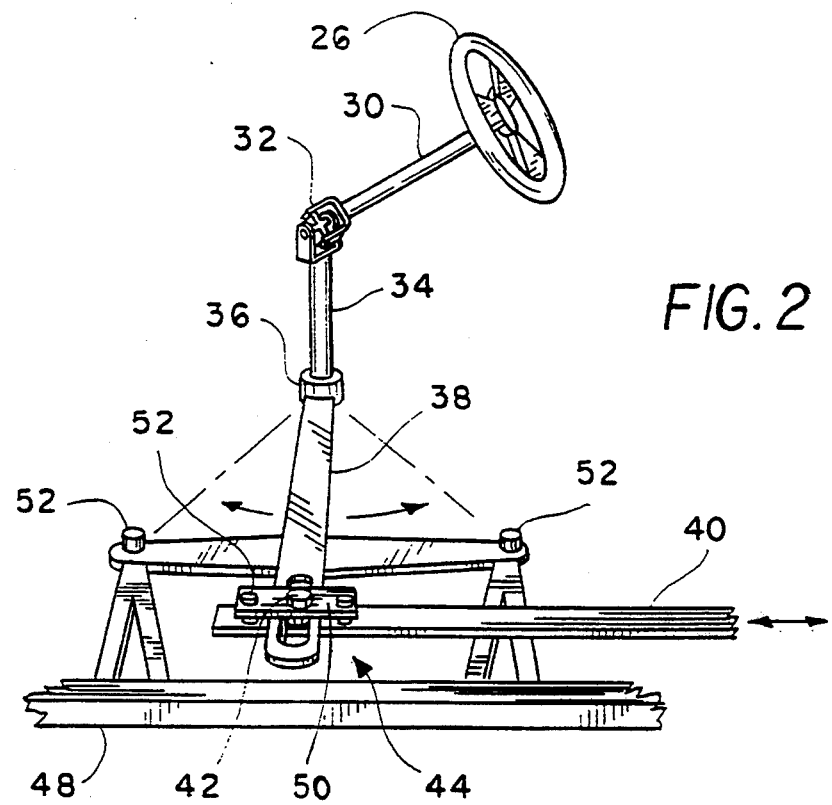
FIG. 2
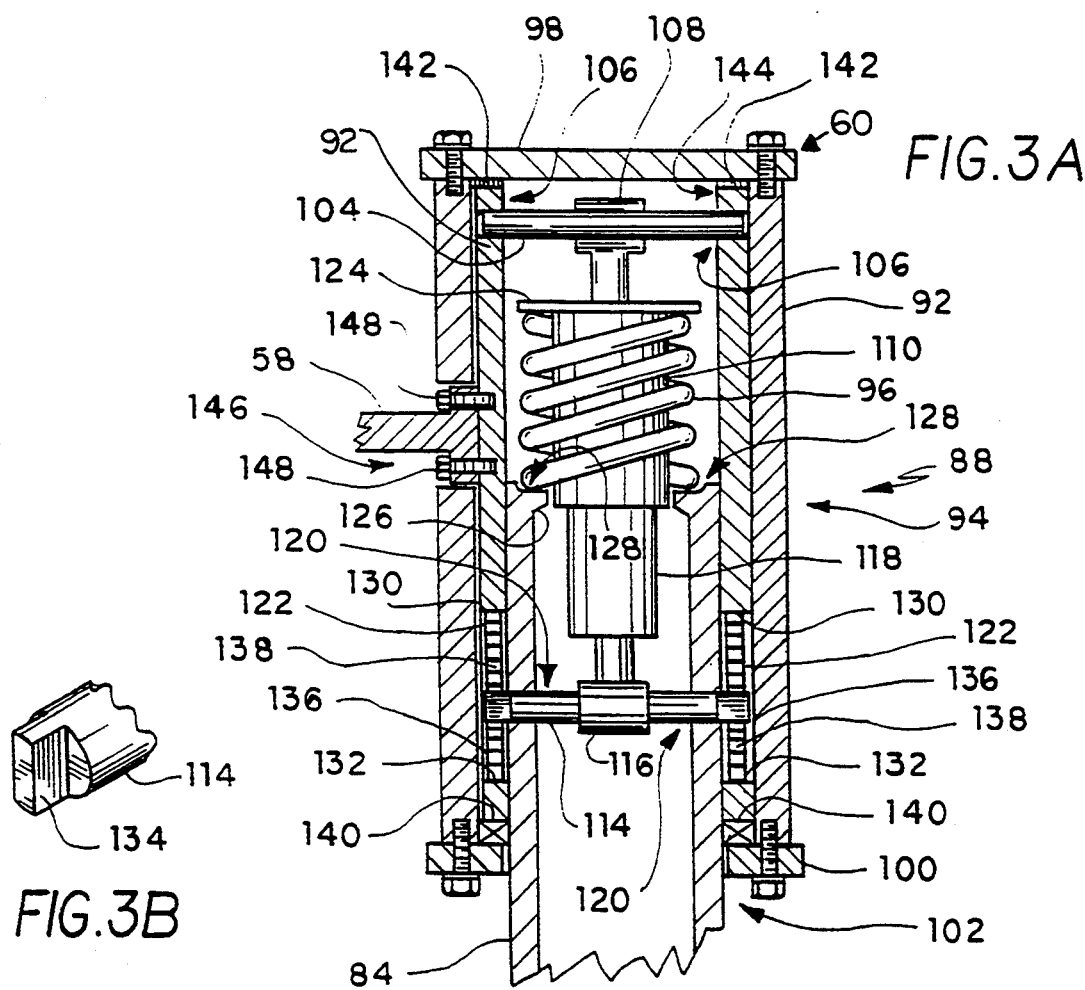
FIG. 3A
FIG. 3B

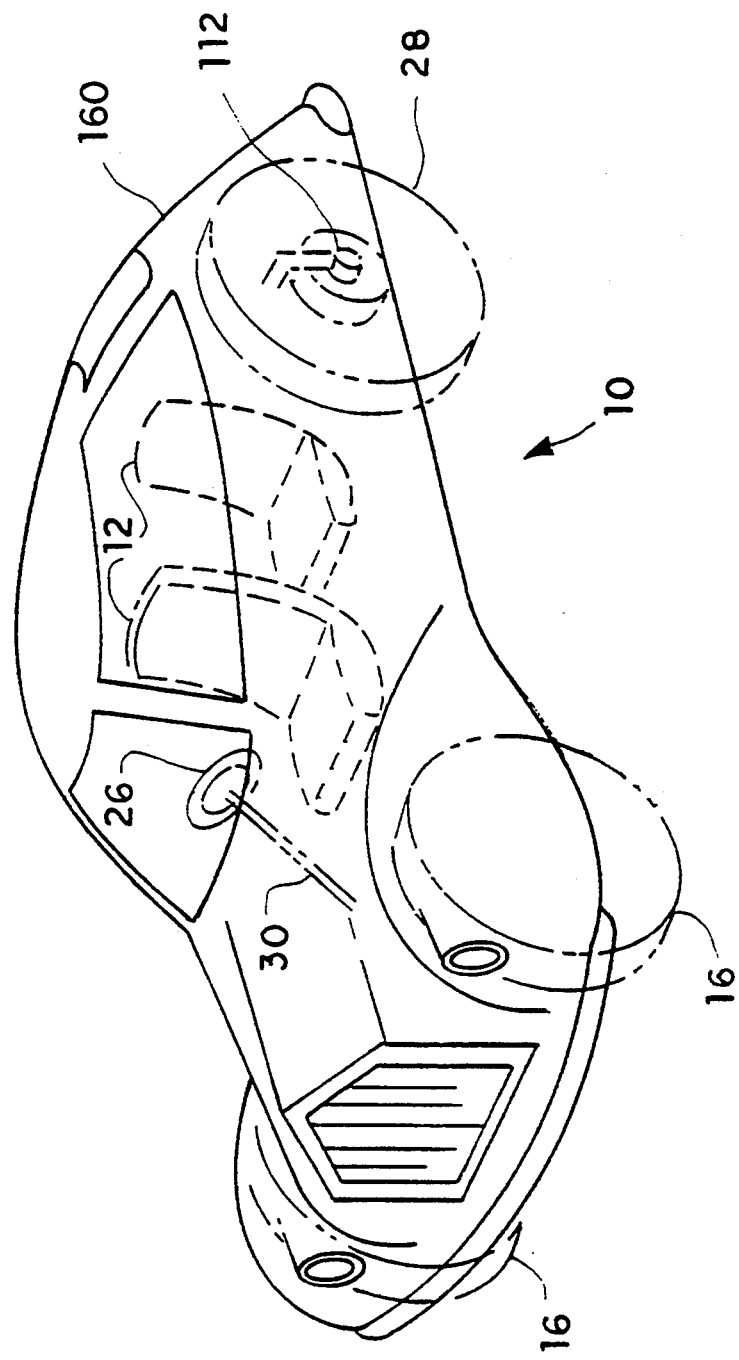

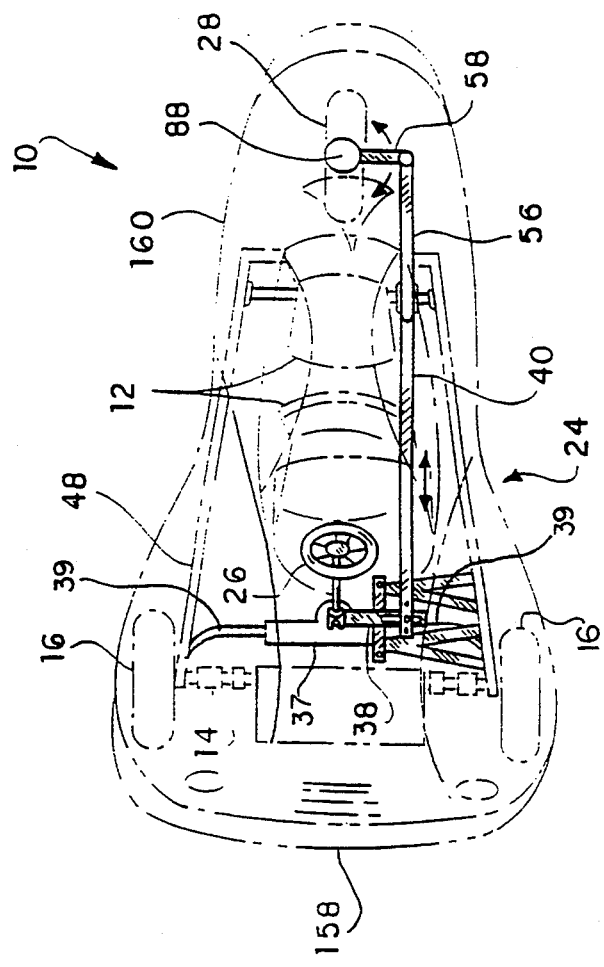
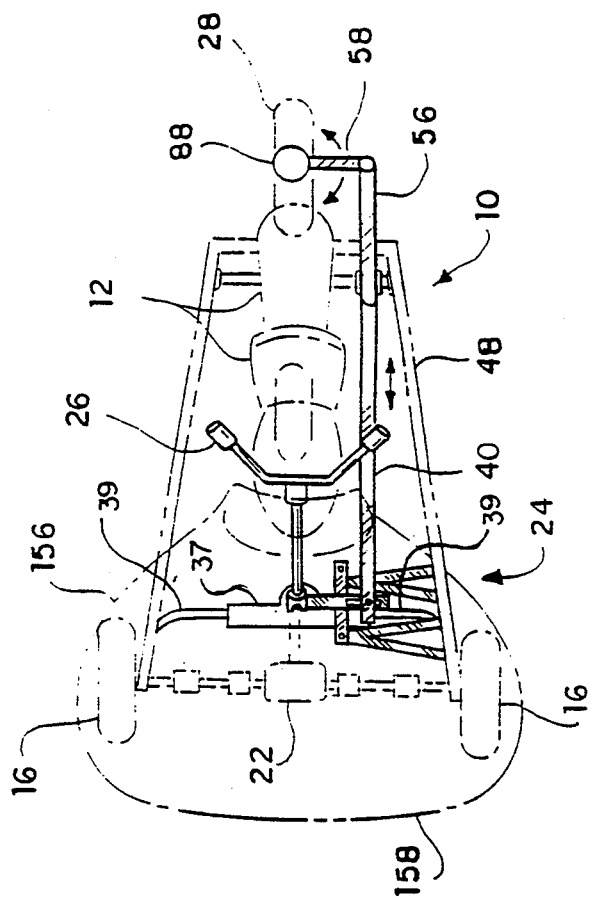

THREE WHEELED VEHICLE WITH ALL WHEEL STEERING

REFERENCE TO RELATED APPLICATION

This application is a Continuation-in-Part of Ser. No. 824,343, filed Jan. 23, 1992, now U.S. Pat. No. 5,248,011.

BACKGROUND OF THE INVENTION

1. Field of the Invention

The present invention relates to a three wheeled powered vehicle, and more particularly to a vehicle wherein there are two driven and steered front wheels, and a steered rear wheel.

2. Description of the Prior Art

Three wheeled vehicles having various steering and driving configurations are known in the prior art. U.S. Pat. No. 1,242,500, issued to Newton K. Wilcox on Oct. 9, 1917, discloses a tractor having two rear wheels and one front wheel. The front wheel is steered, and all three wheels are driven. Two spring towers accommodate vertical displacement of axle travel.

U.S. Pat. No. 2,559,379, issued to Otto E. Szekely on Jul. 3, 1951, discloses a special purpose, three wheeled service vehicle. This vehicle has two front wheels and a driven rear wheel. All three wheels are steered.

A three wheeled, self-propelled mower seen in U.S. Pat. No. 4,162,605, issued to Paul H. Olin et al. on Jul. 31, 1979, features all wheel drive. The single reap wheel is steered.

Another self-propelled mower is disclosed in U.S. Pat. No. 4,263,977, issued to Paul E. Willett on Apr. 28, 1981. A single front wheel is driven and steered. Two rear wheels support weight, but do not contribute to steering or driving.

U.S. Pat. No. 4,589,510, issued to Dierk Duerwald et al. on May 20, 1986, discloses an arrangement for steering all wheels of a three wheeled vehicle. A rod or cable is disposed longitudinally, or front-to-rear, to impose a steering input simultaneously on all wheels. A primary example is related to a vehicle having a single, driven front wheel and two rear wheels. However, the steering system is also adapted for reverse operation of such a vehicle, and which wheels are driven, and whether there are two front and one rear wheel, or the opposite, are not important.

None of the above inventions and patents, taken either singly or in combination, is seen to describe the instant invention as claimed.

SUMMARY OF THE INVENTION

The three wheeled vehicle of the present invention provides front wheel drive and steering of all wheels. A unique steering linkage and a novel rear strut assembly ape combined with an otherwise conventional front wheel steering arrangement. Steering of all wheels provides fast, sure response to a steering input.

A front compartment, located ahead of the driver and between the front wheels, houses a clutch, transmission, and differential. An engine is alternatively located under the driver's seat, motorcycle style, or in the front compartment. Independent front suspension is provided. All wheels ape braked.

In a first embodiment, the three wheeled vehicle has a general appearance of a typically open motorcycle due to its partial body comprising a front fairing spanning both front wheels, and extending to a windshield. A partial body having full width in the front provides a major safety advantage in that visibility of the vehicle to other drivers is greatly improved over a typical motorcycle having little frontal area. The vehicle is superior to a traditional two wheeled motor cycle due to added stability and skidding resistance provided by having three wheels.

A second embodiment provides the general appearance of a typical fully enclosed four wheeled vehicle. The full body covers front and rear wheels and defines a passenger compartment.

The novel vehicle exhibits superior control arising from front traction, and also allows extremely sharp turns. Conventional independent suspension enables satisfactory handling characteristics. In combination with compact outer dimensions, these characteristics result in a vehicle which is very practical in an urban setting. The novel strut and axle assembly eliminate the usual fork straddling the single rear wheel.

Accordingly, it is a principal object of the invention to provide a three wheeled vehicle having two driven front wheels and all wheel steering.

It is another object of the invention to provide a three wheeled vehicle having a rear strut and axle assembly which permits suspension rebound while maintaining an attitude determined by a steering input.

It is a further object of the invention to provide a three wheeled vehicle having bodywork spanning both front wheels, thereby providing maximum frontal visibility.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a perspective detail view of the steering column in FIG. 1, with certain front steering components omitted for clarity.

FIG. 3A is a partial sectional detail view of the rear strut and axle assembly of FIG. 1, drawn to enlarged scale.

FIG. 3B is a fragmentary perspective detail view of the bottom pin in the rear strut of FIG. 3A, and drawn to enlarged scale.

FIG. 4B is a perspective view of a second embodiment of the invention drawn to the two-seat automobile, also emphasizing the bodywork.

FIG. 5 is a top plan view of the invention of FIG. 1, illustrating the second embodiment, the automobile body being shown in broken lines.

FIG. 6 is a top plan view of the invention of FIG. 4A, illustrating a first embodiment, the motorcycle body being shown in broken lines.

Similar reference characters denote corresponding features consistently throughout the attached drawings.

DETAILED DESCRIPTION OF THE PREFERRED EMBODIMENTS

Figure 1:
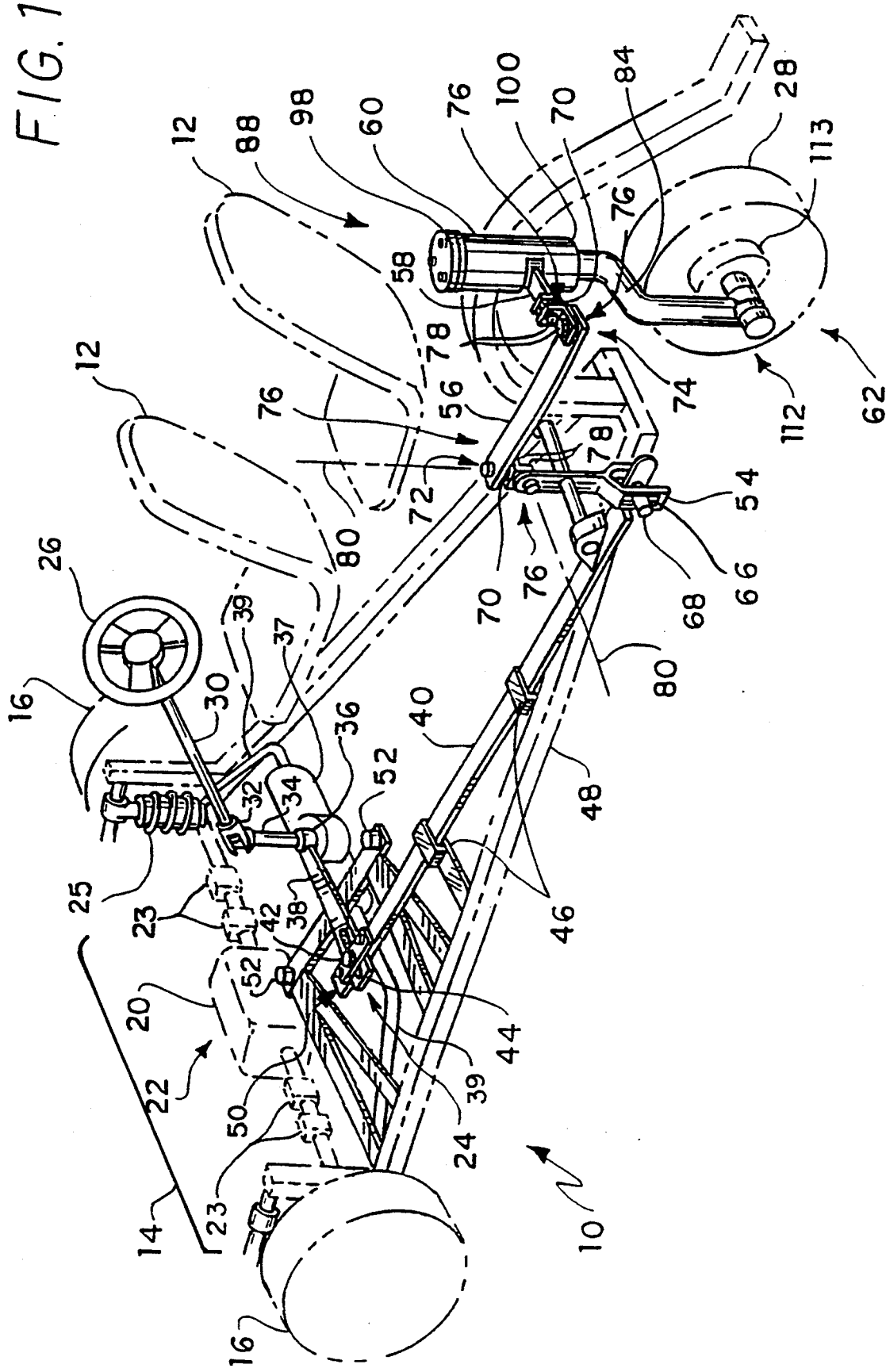
FIG. 1 is a partial perspective view of the a two-seat automobile.
Figure 4A:
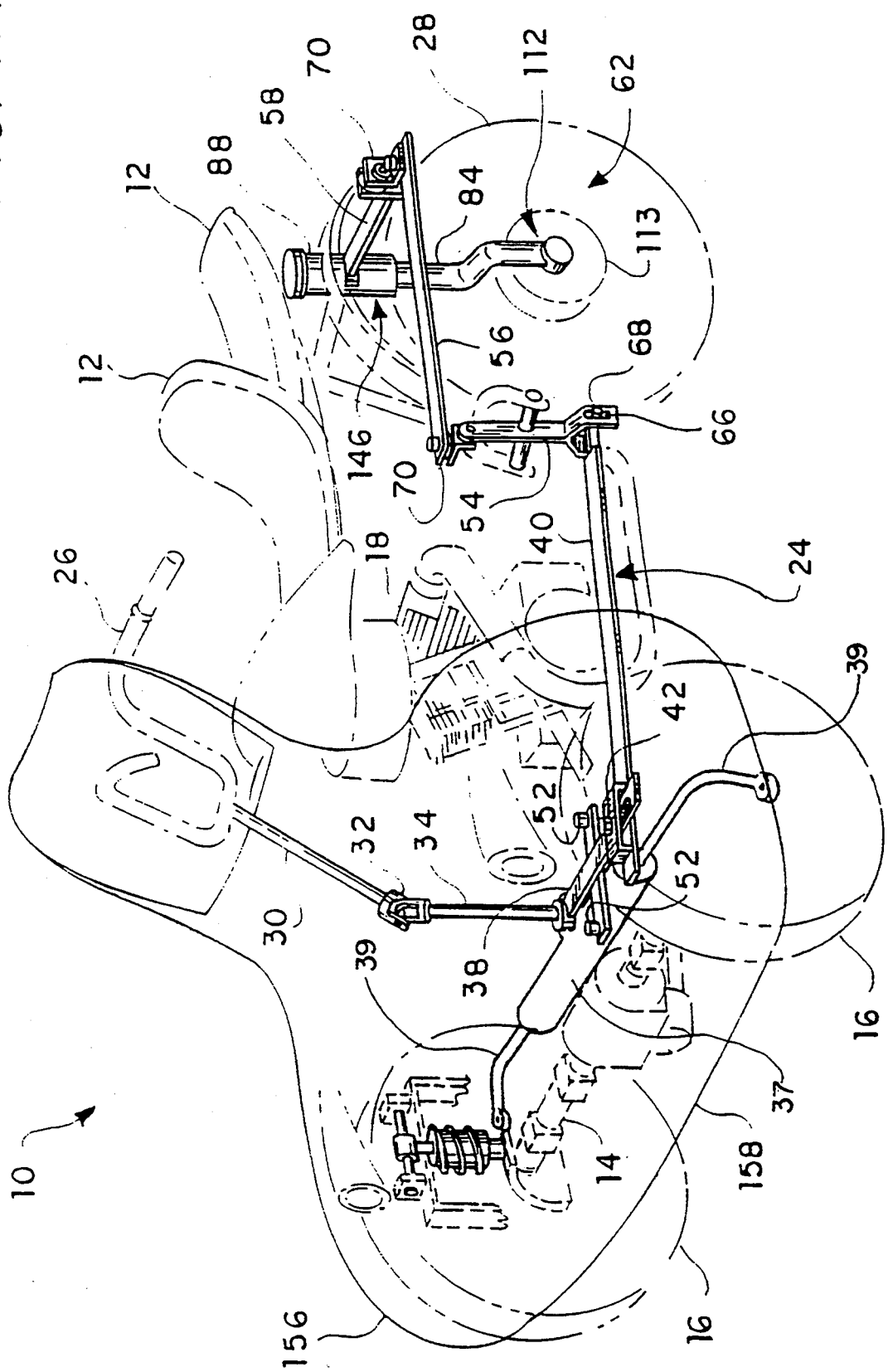
FIG. 4A is a perspective view of a first embodiment of the invention drawn to the motorcycle, emphasizing the bodywork.
Figure 7:
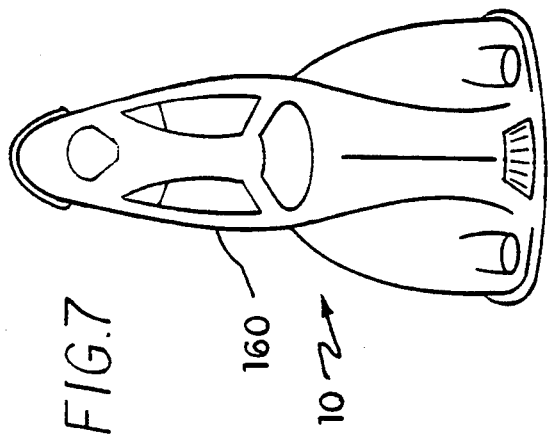
FIGS. 7, 8, and 9 are, respectively, top plan, side elevational, and front elevational views of the second embodiment (automobile), drawn to reduced scale.
Figure 8:
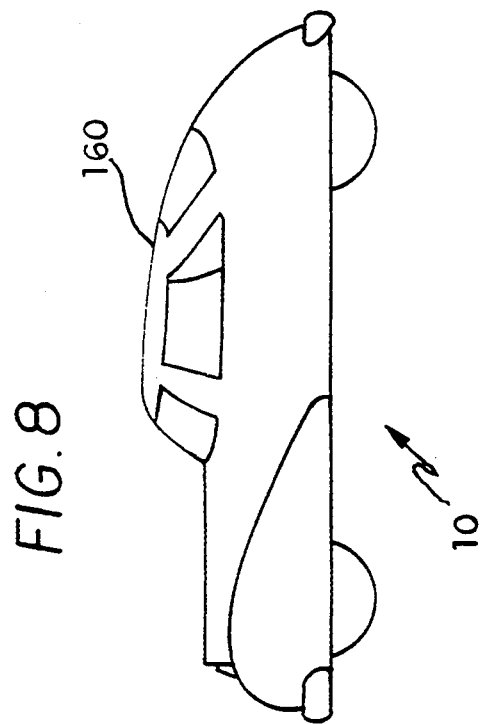
Figure 9:
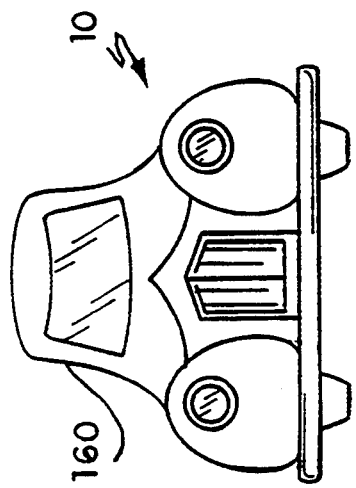

The present invention is seen in FIG. 1 to comprise a three wheeled vehicle 10 having two passenger seats 12 arranged in tandem. The front axle assembly 14 has two wheels 16 disposed thereon, these two wheels 16 being driven in conventional fashion by an engine 18 (better seen in FIG. 4A) through a transmission 20 and a differential gear assembly 22. The vehicle 10 preferably has independent suspension, including universal joints 23 and front suspension springs 25.

As shown in FIGS. 1 and 2, a steering linkage 24 provides translation of motion from a steering wheel or handle bar 26 to the rear wheel 28 which causes directional response of vehicle 10 to follow conventional practice; that is, a clockwise turn to the steering wheel or handle bar 26 (as seen by the driver) steers vehicle 10 to the right. It is to be understood that major components of vehicle 10 such as steering linkage 24, engine 18, transmission 20 and similar items are to be secured to vehicle 10 in any suitable manner well known to those skilled in the art, and thus, further details are omitted.

Steering wheel or handle bar 26 rotates a steering shaft 30 which includes a universal joint 32. A vertical extension shaft 34 of steering shaft 30 extends to and beyond a flange 36 supporting a radius arm 38.

As best seen in FIG. 2, radius arm 38, which turns in lockstep with steering wheel or handle bar 26, moves a longitudinal member 40 in linear fashion. A pin or bolt 42 fastened to longitudinal member 40 rides in a slot 44 disposed in radius arm 38. Longitudinal member 40 is constrained by suitable brackets 46 attached to vehicle frame 48 to move linearly fore and aft with respect to vehicle 10. Pin or bolt 42 also secures a retainer 50 which holds radius arm 38 in operative relation to longitudinal member 40. Stops 52 disposed on vehicle frame 48 limit angular travel of radius arm 38.

Front wheel steering is provided in addition to rear steering. Again referring to FIG. 1, vertical extension shaft 34 extends past flange 36 to terminate in a steering box 37. Steering box 37 moves arms 39, which attach to respective conventional steering knuckles (not shown), or by any other suitable arrangement to each front wheel 16. Although steering box 37, as depicted throughout the drawing figures, illustrates a rack and pinion arrangement, it is obviously possible to substitute a pitman arm type steering arrangement, or any other well known steering arrangement to the same effect.

Experience with single wheel steering indicates that eighty-five degrees of arc of steering rotation provides the ability to achieve very sharp turns. This is a great advantage to a vehicle in urban use, wherein parking and general maneuvering may be available only to vehicle having extreme maneuvering capabilities.

Longitudinal member 40 connects to a pivoting member 54, which in turn moves a short longitudinal member 56 fore and aft. Short longitudinal member 56 moves a rear radius arm 58 (due to two pins 78) attached to a cylindrical housing 60 of a rear axle assembly 62. Pivoting member 54 has an elongated slot 66 surrounding a pin 68 (see FIG. 4A) connected to longitudinal member 40. This arrangement permits operative interengagement of longitudinal member 40, which moves linearly, with pivoting member 54. Similarly, accommodation of motion as short longitudinal member 56 moves in all three planes while transferring steering inputs to rear radius arm 58 is provided by two universal joints 70 located at forward and rear ends 72, 74 of short longitudinal member 56. These universal joints 70 comprise ball bearing assemblies 76 having rotating axes 80 normal to one another. Obviously, the geometry of both universal joints 70 is substantially identical, even though rotating axes 80 are shown for only one universal joint 70.

The cylindrical outer housing 60 is keyed to a vertically oriented segment 84 of rear axle assembly 62, which rear axle assembly 62 supports and turns rear wheel 28. This keyed relationship will be understood as rear axle assembly 62 is explained.

Referring to FIG. 3A, vertically oriented segment 84 of rear axle assembly 62 rides concentrically within a tower assembly 88 comprising a cylindrical outer housing 60 firmly secured to vehicle 10, an inner rotating cylinder 92, a shock absorber 94, and rear suspension spring 96. Inner rotating cylinder 92 is constrained to rotate upon receiving steering inputs from rear radius arm 58, and not to move axially. Axial displacement is prevented by upper and lower caps 98, 100 bolted to outer cylindrical housing 60. Lower cap 100 has an orifice 102 defined therein allowing passage therethrough of the suspension strut 84.

A top pin 104 penetrating diametrically opposing bores 106 formed in inner rotating cylinder 92 also penetrates a boss 108 attached to an upper, stationary part 110 of shock absorber 94. Because top pin 104 is anchored within inner rotating cylinder 92, the upper, stationary part of shock absorber 94 does not experience vertical displacement.

A bottom pin 114 penetrates a lower boss 116 formed in a lower, vertically displaceable portion 118 of shock absorber 94 and also penetrates diametrically opposed bores 120 in the suspension strut 84. The bottom pin 114 extends beyond the suspension strut 84 into slots 122 formed in inner rotating cylinder 92.

The rear suspension spring 96 is retained between an upper flange 124 secured to the shock absorber's upper part 110 and a lower flange 126 formed at top surface 128 of the suspension strut 84.

The bottom pin 114 keys suspension strut 84 to rotate in lockstep with inner rotating cylinder 92. Because of the elongated nature of slots 122, the suspension strut 84 may slide axially within tower assembly 88 to a limited degree, which motion accommodates vertical displacement periodically encountered as vehicle rear wheel 28 negotiates minor obstructions in a road (not shown), such as potholes or stones. Upper and lower surfaces 130, 132 of slots 122 serve as stops limiting this motion. Therefore, within limits imposed by the elongated dimension of slots 122, rear axle assembly 62 rises and falls as road conditions dictate while being to rotate with, and thereby accept steering inputs from, inner rotating cylinder 92.

At the lower end 112 of the rear axle assembly 62 (FIG. 1) connects to and supports rear wheel 28. This is done in conventional fashion, and includes a brake drum assembly 113, understood to include necessary wheel bearings (not shown).

Bottom pin 114 is machined to present a planar surface 134 facing sides 136 of slots 122 (FIG. 3A), as seen in FIG. 3B. Slots 122 have needle bearing assemblies 138 to reduce wear due to frictional contact as bottom pin 114 rises and descends therein between upper surfaces 130, 132, respectively, of slots 122.

Roller bearings 140 support inner rotating cylinder 92 within cylindrical outer housing 60. Washers 142 having surfaces exhibiting low friction, such as provided by coating with polytetrafluoroethylene compounds, for example, are employed at the top 144 of inner rotating cylinder 92.

An aperture 146 defined in cylindrical outer housing 60 allows communication of radius arm 58 with inner rotating cylinder 92, to which radius arm 58 is suitably fastened, as by bolts 148.

The present invention has two embodiments. In a first embodiment shown in FIGS. 4A and 6, bodywork 156 extends from the front 158 of vehicle 10 to just behind the front wheels 16. In this embodiment, vehicle 10 appears similar to a motorcycle, while retaining certain advantages presented herein arising from the novel arrangement of mechanical components.

In a second embodiment, shown in FIGS. 4B, 7, 8, and 9, bodywork 160 extends beyond bodywork 156 of the first embodiment to envelope the entire vehicle 10. This embodiment essentially simulates a conventional fully enclosed automobile, while retaining the qualities of all wheel steering, three wheels, and reduced weight and complexity, while retaining certain advantages of conventional vehicles.

It is to be understood that the present invention is not limited to the sole embodiment described above, but encompasses any and all embodiments within the scope of the following claims.

I claim:

1. A three wheeled vehicle, there being a front axle and a rear axle mounted thereon, two front wheels disposed upon said front axle and one rear wheel disposed upon said rear axle, said vehicle including at least one passenger seat mounted thereon, power means mounted within said vehicle, transmission means operably connected to said power means and to said front wheels, thereby driving said front wheels, suspension means mounted to said vehicle and connecting said front wheels and said rear wheel thereto, and steering means mounted to said vehicle and to each of said wheels, said steering means controlling all of said wheels, said steering means causing directional response of said vehicle to a steering input wherein clockwise rotation of a steering shaft, as viewed by a driver, causes said vehicle to steer to a right side direction, and counterclockwise rotation of said steering shaft, as viewed by a driver, causes said vehicle to steer to a left side direction, wherein said two front wheels are driven by said power means through said transmission means, and at least one of said wheels further having suspension means including spring means and shock absorbing means disposed within inner and outer concentric members, said inner and outer concentric members being mechanically linked one to another whereby said inner and outer concentric members rotate to the same degree while permitting said inner concentric member to be axially displaced while said outer concentric member is axially immobilized, and whereby said at least one of said wheels is enabled to be vertically displaced relative to said three wheeled vehicle while maintaining an attitude; determined by a steering input and simultaneously maintaining a portion of the weight of said three wheeled vehicle supported thereon.

2. The three wheeled vehicle according to claim 1, further having bodywork covering, partially enclosing, and spanning both of said front wheels, and extending from a front of said vehicle to behind said front wheels.

3. The three wheeled vehicle according to claim 1, further having bodywork covering, partially enclosing, and spanning both of said front wheels, and extending from a front of said vehicle to behind said rear wheel.

4. The three wheeled vehicle according to claim 1, further having bodywork covering, partially enclosing, and spanning at least both of said two front wheels, and extending from a front of said vehicle to at least behind said front wheels.

5. The three wheeled vehicle according to claim 4, further having bodywork covering, partially enclosing, and spanning both of said front wheels, and extending from a front of said vehicle to behind said rear wheel.

6. A three wheeled vehicle, there being a front axle and a rear axle mounted thereon, two front wheels disposed upon said front axle and one rear wheel disposed upon said rear axle, said vehicle including at least one passenger seat mounted thereon, power means mounted within said vehicle, transmission means operably connected to said power means and to said front wheels, thereby driving said front wheels, suspension means mounted to said vehicle and connecting said front wheels and said rear wheel thereto, and steering means mounted to said vehicle and to each of said wheels, said steering means controlling all of said wheels, said steering means causing directional response of said vehicle to a steering input wherein clockwise rotation of a steering shaft, as viewed by a driver, causes said vehicle to steer to a right side direction, and counterclockwise rotation of said steering shaft, as viewed by a driver, causes said vehicle to steer to a left side direction, wherein said two front wheels are driven by said power means through said transmission means, and said one rear wheel further having suspension means including spring means and shock absorbing means disposed within inner and outer concentric members, said inner and outer concentric members being mechanically linked one to another whereby said inner and outer concentric members rotate to the same degree while permitting said inner concentric member to be axially displaced while said outer concentric member is axially immobilized, and whereby said one rear wheel is enabled to be vertically displaced relative to said three wheeled vehicle while maintaining an attitude determined by a steering input and simultaneously maintaining a portion of the weight of said three wheeled vehicle supported thereon.

7. The three wheeled vehicle according to claim 6, further having bodywork covering, partially enclosing, and spanning both of said front wheels, and extending from a front of said vehicle to behind said front wheels.

8. The three wheeled vehicle according to claim 6, further having bodywork covering, partially enclosing, and spanning both of said front wheels, and extending from a front of said vehicle to behind said rear wheel.

9. The three wheeled vehicle according to claim 6, further having bodywork covering, partially enclosing, and spanning at least both of said two front wheels, and extending from a front of said vehicle to at least behind said front wheels.

10. The three wheeled vehicle according to claim 9, further having bodywork covering, partially enclosing, and spanning both of said front wheels, and extending from a front of said vehicle to behind said rear wheel.

* * * * *